Dec. 24, 1957  H. BRADNER ET AL  2,817,350
DEVICE FOR CONTROL OF OXYGEN PARTIAL PRESSURE
Filed June 1, 1955
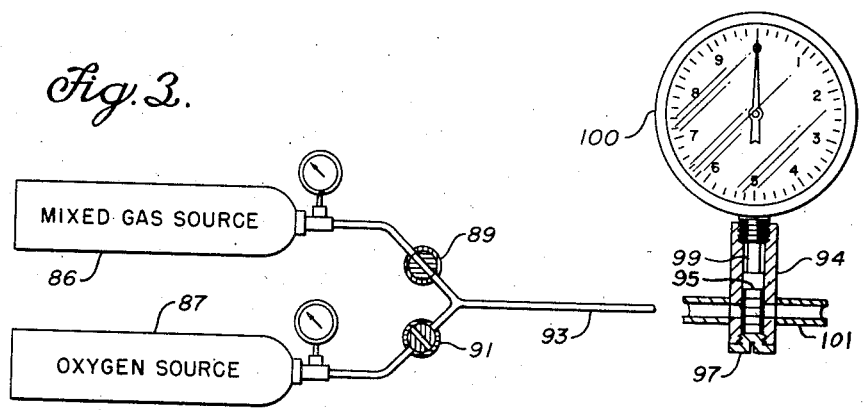
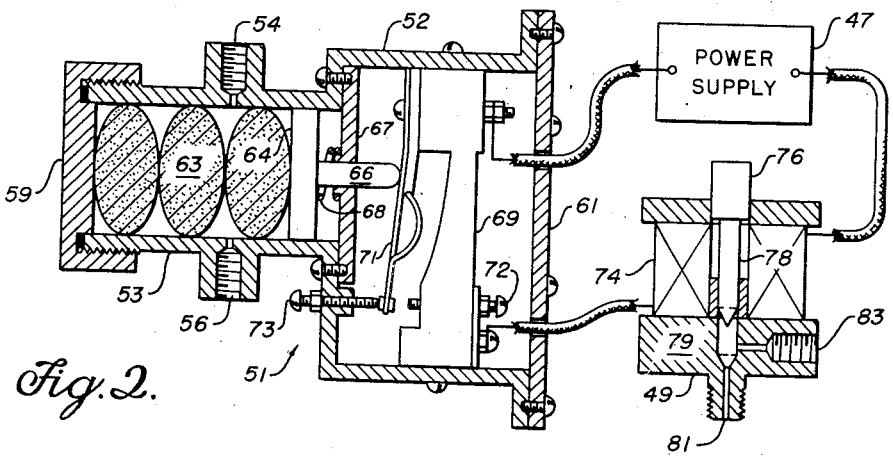
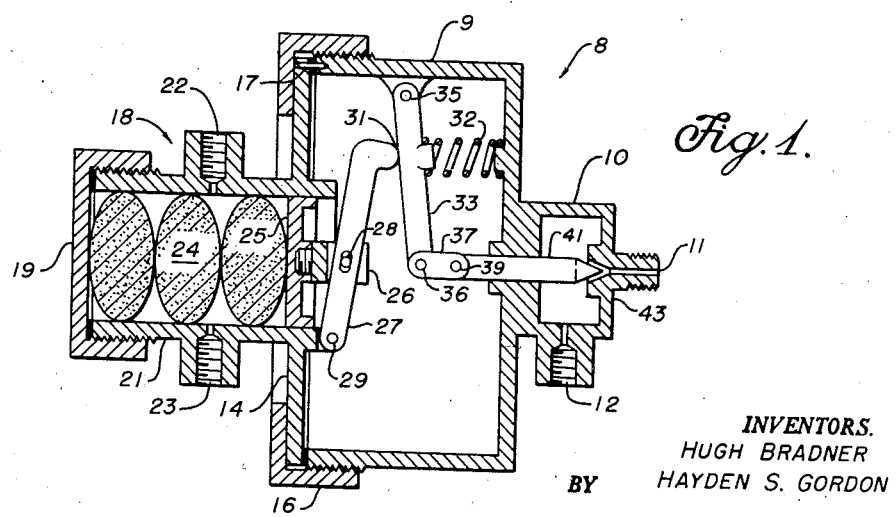
INVENTORS.
HUGH BRADNER
HAYDEN S. GORDON
BY Roland A. Anderson
ATTORNEY.

United States Patent Office 2,817,350
Patented Dec. 24, 1957

2,817,350

DEVICE FOR CONTROL OF OXYGEN PARTIAL PRESSURE

Hugh Bradner, Berkeley, and Hayden S. Gordon, Lafayette, Calif., assignors to the United States of America as represented by the United States Atomic Energy Commission Application June 1, 1955, Serial No. 512,592

11 Claims. (Cl. 137—87)

This invention relates to a device for the detection and control of variations in the partial pressure of oxygen in mixed gas systems, and more particularly, to such a device wherein said control is dependent upon the variations in physical dimensions of certain crystalline structures which are sensitive to minute changes in oxygen partial pressure.

A considerable need exists for a device for determining the concentration of oxygen in a mixture of gases. The use of pressurized cabins for aircraft which operate at at high altitudes, for example, makes desirable such a monitoring device whereby the amount of oxygen in the aircraft's atmospheric system may be maintained within certain limits. A similar need for such a device exists in other closed systems of gases supporting animal respiration such as are found in caissons, submarines and the like. This type of device would also be applicable to the control of chemical reactions and processes which are dependent on a specific partial pressure of oxygen in the reaction system.

The majority of gas control systems in present use depends on the gross combined pressure of the entire gas mixture for operation, without provision for variation in the concentrations of the individual constituent gas phases. Thos contemporary systems based for their operation on the variation of a single phase or factor in the mixed system pertain largely to a variation in an aqueous component. Humidity detectors offer a common example of the latter. Pauling (U. S. Patent No. 2,416,344) has invented a meter for determining the partial pressure of oxygen in a mixture of gases which is dependent upon the paramagnetic properties of the subject gas. Such a device, however, is influenced by the presence of any paramagnetic gas and may, therefore, indicate the presence of gases other than oxygen in the system. Existing devices depending upon paramagnetic properties of gases, such as that cited supra, are usually very fragile and tedious of assembly, and require a relatively gross magnetic field structure.

Now there has been discovered a device whereby variations in oxygen partial pressures of gaseous systems may be readily measured and may operate means of gas control and the like. By utilizing the unique physical qualities of certain chemical entities, namely chelates, which have the property of expansion with increases in oxygen concentration and corresponding contraction with decreases in oxygen concentration, a rugged, compact, and efficient device for translating relative oxygen partial pressure in a mechanical force is achieved. This mechanical force may then be used to actuate electrical circuits and the like by means of appropriate switching devices or may be used directly for measurement or operation functions.

Accordingly, a principal object of the invention is to provide a rugged, dependable device for detecting and measuring variations in oxygen partial pressure in mixed gas systems.

Yet another object of the invention is to provide a device for actuating mechanical and electrical devices according to variations in the partial pressure of oxygen in a system of gases.

A further object of the invention is to provide an automatic monitor for oxygen levels in mixed gas systems.

Other objects and applications of the invention will become readily apparent from a consideration of the following description and claims taken in conjunction with the accompanying drawing of which:

Figure 1 is a sectional view of a simple mechanical valve structure for modifying gas flow according to variations in the oxygen content of an ambient atmosphere;

Figure 2 shows an electro-mechanical system for controlling oxygen levels in an enclosed gas system; and Figure 3 illustrates a device for indicating changes in oxygen content of a mixed gas system.

With the device of this invention, the maintenance of an atmospheric system with a chosen oxygen content is readily feasible. The operation of the invention is based upon the unique structure and physicochemical properties of chemical compounds known as chelates. Certain of these chelates are capable of sorption and desorption of oxygen within the crystal lattice structure according to variations in the partial pressure of oxygen in the gas system. Sorption of the gas is accompanied by an angular displacement of the plane of the chelate ring and, hence, a variation in the overall physical dimensions of the crystalline structure. The binding of the molecular oxygen in the interstices of the porous crystalline lattice is possible because of the rapid diffusion of the gaseous oxygen through the open network and by the proper atomic spatial relationship in the crystal which allows bridging of two atoms from different adjacent chelate units by a molecule of oxygen.

Not all chelate compounds are adaptable for use in the present invention; it is to be noted that the chelate compound chosen for the operation of such apparatus must be a reversible oxygen carrier, i. e., one which accomplishes both sorption and desorption of the oxygen phase in the crystal lattice. Several examples of such reversible chelates, both natural and synthetic, belonging to the polydentate organo-metallic class are listed in the following Table I.

TABLE I

| Chelate | Metal Ion | Donor Groups | Molar Ratio, $O_2$/Chelate |
|---|---|---|---|
| Cobalt Derivatives of bis-organic imines. | $Co^{II}$ | bis-(salicylaldehyde) ethylenediimine. | 1:2 |
| | $Co^{II}$ | bis(3-ethoxysalicylaldehyde) ethylenediimine. | 1:2 |
| | $Co^{II}$ | bis(3-fluorosalicylaldehyde) ethylenediimine. | 1:2 |
| | $Co^{II}$ | bis(3-nitrosalicylaldehyde) ethylenediimine. | 1:2 |
| | $Co^{II}$ | bis(O-hydroxyacetophenone) ethylenediimine. | 1:2 |
| | $Co^{II}$ | bis-histidine. | 1:2 |
| hemocyanin | $Cu^{I}$ | | 1:2 |
| hemoglobins | $Fe^{II}$ | porphin and histidine derivatives. | 1:1 |

Referring now to the drawing, the operation and structure of a means for regulating fluid flow according to systemic oxygen partial pressure which embodies the present invention can be more readily explained by reference to Figure 1 which shows in diagrammatic form all of the essential elements thereof. Referring to this figure, the device comprises a lever housing 8 defining a lever chamber 9, a valve chamber 10, valve inlet port 11, and valve outlet port 12, said housing having a removable cover plate 14 retained in a fixed position by a cap 16, and positioning pin 17, said plate having integrally attached thereto a cylindrical chelate housing 18 with removable closure cap 19, chelate chamber 21, gas inlet port 22, and gas outlet port 23. Chelate material 24 is contained in said housing and bears on reciprocable piston 25, said piston having a central coaxial piston rod 26 attached thereto, said rod having a lever-accommodating slot with a primary lever arm 27 slidably retained therein by pin 28. The primary lever arm is pivotally mounted at one end on pin 29 and has at the opposite end a bearing surface 31 contacting a portion of the spring-opposed secondary lever arm 33 between the pivot pin 35, which is fixed to the housing 9 and, at the opposite end of said arm, the pivot pin 36. Said secondary lever arm 33 is pivotally connected through pin 36 to link 37 which is pivotally connected through pin 39 to valve plug 41 in the valve chamber 10 of valve body 43.

In the manner of operation of this device, a quantity of the gas mixture containing oxygen as one of its component gases is admitted to the chelate housing 18 through inlet port 22. The oxygen, or a portion thereof, is absorbed from the mixed gas into the chelate structure 24, with the unabsorbed gases passing out of the device through outlet port 23. With the absorption of the oxygen, the chelate molecules expand, causing a translational displacement of the reciprocable piston 25 which is magnified in amplitude and transmitted through a spring-opposed lever linkage comprising essentially a primary lever arm 27, a secondary lever arm 33, and a link 37, to the valve plug 41. Said valve plug 41 accordingly approaches and may ultimately impinge upon the corresponding seat portion of the valve body 43, thus restricting or arresting the flow of fluids into the valve body through inlet port 11 and out of outlet port 12.

Conversely, with a diminished partial pressure of oxygen in the monitored gas supply, the chelate structure 24 will contract, allowing the piston 25, primary lever arm 27, secondary lever arm 33, link 37, and valve plug 41 to return to the original open valve position under pressure of spring 32.

The invention is by no means limited to the embodiment described supra, but may be manifested in various alternative applications. An example of such an application may be adequately illustrated by reference to Figure 2 which shows a variation utilizing an electrical system to achieve the purposes of the invention. Such embodiment includes a power supply 47, a solenoid operated valve 49, and switching means comprising a housing 51 defining a switch chamber 52, and a cylindrical chelate chamber 53, having a gas inlet port 54 and a gas outlet port 56. A removable cover cap 59 seals the chelate chamber 53 at one end of housing 51; cover plate 61 seals the switch chamber 52 at the opposite end of the housing 51. Contained within said chelate chamber 53 is chelate material 63 bearing on a reciprocable piston 64, said piston having an axially disposed piston rod 66 passing through a central aperture of piston stop plate 67. Disposed between piston 64 and piston stop plate 67 and coaxially about piston rod 66 is piston opposing spring 68. Within the switch chamber 52 is disposed a microswitch body member 69 of an insulated material, a conducting switch armature 71, an adjustable contact element 72, and an armature tension adjustment screw 73. The solenoid operated valve 49 comprises a field coil 74, an armature 76 having one end thereof attached to valve plug 78, and a valve body 79 having a fluid inlet port 81 and a fluid outlet port 83.

In the manner of operation of the described embodiment, a quantity of the gas mixture containing oxygen is admitted to the chelate chamber 53 through the gas inlet port 54, contacting chelate material 63. When the oxygen partial pressure of the monitored gas mixture exceeds a certain equilibrium level in relation to that in the chelate molecule, the chelate absorbs oxygen in attempting to maintain this equilibrium. Said absorption is accompanied by molecular expansion sufficient to impart a translational motion to the reciprocable spring-opposed piston 64 and through the piston rod 66 to the armature 71 of the microswitch. Upon mechanical actuation, the microswitch armature contacts contact element 72, completing the circuit from the power supply 47 to the field of solenoid operated valve 49, and energizing the field coil 74. Armature 76 is attracted into the magnetic field of said field coil 74 causing the valve plug 78 to impinge upon the seat portion of the valve body 79, thereby arresting the fluid flow through inlet port 81 and outlet port 83. Variation in armature tension and position is achieved by adjustment of the armature tension adjustment screw 73 to conform to the desired partial pressure of the oxygen in the system.

If the oxygen partial pressure of the monitored gas mixture is less than the equilibrium level of the chelate molecule, a contraction of the chelate crystalline structure occurs. This allows a corresponding retraction of the piston 64 and piston rod 66 which is bearing on the chelate material 63 under pressure from opposing spring 68. With the withdrawal of the piston rod 66, the armature 71 of the microswitch which is bearing on the terminal portion of said piston rod 66 returns to a position at which the flexed armature spring moves to the off position, thereby interrupting the circuit from the power supply to the solenoid valve. With de-energization of the solenoid, the valve plug 78 is withdrawn from the seat portion of valve body 79, admitting the oxygen bearing gases to the system through fluid inlet port 81 and outlet port 83.

Another application of this invention is illustrated in Figure 3 which shows a typical means for indicating or measuring the oxygen partial pressure within a mixed gas system. With reference to the figure, there is shown a gas source 86 and an oxygen source 87 connected through control valves 89 and 91, and passes through tube 93 to a chelate chamber housing 94 having a gas outlet tube 101 and containing pellets of a crystalline chelate 95 supported between a normally fixed, removable chamber cap 97 and a reciprocable probe 99 of micrometer dial displacement indicator 100.

In the operation of the subject embodiment, oxygen from oxygen source 87 is mixed with gas from gas source 86 through valves 89 and 91, and passes through tube 93 to the chelate chamber housing 94. Within this chamber is disposed chelate material 95 which may be in the form of pellets, as shown in the figure, or any other suitable form. Upon sorption of the oxygen within the chelate structure, expansion thereof occurs, imparting a translational motion to the probe 99, the displacement of which is registered on the dial of the micrometer dial displacement indicator 100. It will be apparent to those skilled in the art that said indicator is of a type well known in the art and commercially available.

The characteristics of such a system as described supra, together with the operation thereof, may be further elucidated by reference to the following example of a typical experiment utilizing said system:

*Example*

An experiment was performed in which a cylinder of commercial purity argon gas and a cylinder of commercial purity oxygen gas were provided with valves at their respective apertures, with said valves discharging into a common tube or pipe and with said pipe leading to the chelate chamber. The chamber was loosely packed with a 1.75 inch long column of pellets of a crystalline chelate, cobalt bis-salicylaldehyde ethylenediimine, at a room temperature of ca. 23.5° C. The chelate particles were equilibrated by exposure to oxygen for 24 hours, at which time the dial reading of the pressure gauge was recorded and the oxygen supply valve was closed. The argon supply valve was then opened and argon gas was admitted to the system. This procedure of alternately admitting oxygen, then argon, was continued over a period of 36 minutes and a series of readings of the fluctuations of the dial indicator were recorded. The recorded displacements correlated with the time and gas cycle are indicated in the following table:

TABLE II

| Change in Length, Mils | Time, Minutes | Remarks |
|---|---|---|
| 0.00 | 0.0 | Chelate is saturated with $O_2$. Argon turned on. |
| 0.40 | 5.0 | |
| 0.65 | 12.0 | |
|  | 13.0 | Argon turned off; Oxygen turned on. |
| 0.60 | 13.5 | |
| 0.40 | 15.0 | |
| 0.35 | 20.0 | |
| 0.32 | 25.0 | Oxygen turned off; Argon turned on. |
| 0.51 | 30.0 | |
| 0.70 | 35.0 | Argon turned off; Oxygen turned on. |
|  | 35.5 | All gas turned off. |
| 0.52 | 36.0 | |

The above data show conclusively that substantial changes occur in the dimensions of the chelate material corresponding to the transient oxygen content of the introduced atmosphere.

While several embodiments of the invention have been described herein and illustrated in the drawings, it is to be expressly understood that the invention is not limited thereto but is capable of a wide variety of physical and mechanical forms, materials, and dimensions, many of which will now become apparent to those skilled in the art. Reference is accordingly to be had to the following claims for a definition of the limits of the invention.

What is claimed is:

1. An apparatus responsive to variations in the partial pressure of oxygen in a gaseous system comprising a container having a gas inlet port and a gas outlet port and a closure movable inwardly and outwardly thereof to thereby vary the volume of said container, and a quantity of a reversible, oxygen-carrying chelate substantially filling said container and in pressure-transmitting relation to said closure.

2. In a device responsive to variations in the partial pressure of oxygen in a system of mixed gases, the combination comprising a housing defining a chelate chamber having an inlet port and an outlet port; a reversible oxygen-carrying chelate material disposed within said chelate chamber and serving as a pressure source; said housing also including a wall member in contact with, and reciprocably responsive to the pressure exerted by, said chelate material.

3. A device for measuring variations in the partial pressure of oxygen in a system of mixed gases comprising a housing defining a chelate chamber, a chelate chamber inlet port, and a chelate chamber outlet port; a reversible oxygen-carrying chelate material disposed within said chelate chamber; a reciprocable chelate contact plate bearing on said chelate material; and a surface displacement indicator integral with said housing, comprising an indicator body member, an indicator probe, probe displacement amplifying means, and amplified displacement registering means, said chelate contact plate having impinging contact with said indicator probe.

4. A device for controlling variations in the partial pressure of oxygen in a system of mixed gases comprising a housing defining a chelate chamber, a chelate chamber inlet port, a chelate chamber outlet port, and a lever chamber; a valve body integrally attached to said housing and defining a valve chamber, a valve chamber inlet port, and a valve chamber outlet port; a reversible oxygen-carrying chelate material disposed within said chelate chamber; a reciprocable contact member bearing on said chelate material; a valve plug reciprocably mounted in said valve body; and a displacement-amplifying lever linkage connecting said contact member and said valve plug.

5. A device for controlling variations in the partial pressure of oxygen in a system of mixed gases comprising a cylindrical housing defining a chelate chamber, a lever chamber and a valve chamber, said chelate and valve chambers having an outlet port and an inlet port; removable closure means disposed at one end of said chelate chamber; a reversible, oxygen-carrying chelate disposed within said chamber; a reciprocable piston means bearing on said chelate; a primary amplifying lever arm disposed within said lever chamber and movably attached to said piston means, having one end pivotally mounted on said housing, and with the opposite end bearing on a portion of a secondary amplifying lever arm having one end pivotally mounted on said housing; a movable plug disposed within said valve chamber; and a floating linkage connecting the free termination of the secondary lever arm with said plug.

6. An apparatus for controlling variations in the partial pressure of oxygen in a system of mixed gases comprising an oxygen source; switching means comprising a housing defining a switch chamber, a chelate chamber, a chelate chamber gas inlet port communicating with said oxygen source and a chelate chamber gas outlet port; a reversible oxygen-carrying chelate material disposed within said chelate chamber; a reciprocable contact plate bearing on said chelate material; a pressure operated electrical switch; force transmitting means disposed between said plate and the armature of said electrical switch; a power supply; and a solenoid actuated valve connected in series with said electrical switch and said power supply and controlling flow from said oxygen source.

7. In an apparatus for controlling the partial pressure of oxygen in a system of mixed gases, switching means comprising a housing defining a switch chamber, a chelate chamber, a chelate chamber gas inlet port and a chelate chamber gas outlet port; a reversible oxygen-carrying chelate material disposed within said chelate chamber; a reciprocable contact plate bearing on said chelate; a pressure operated electric microswitch; and force transmitting means disposed between said plate and the armature of said microswitch.

8. An oxygen partial pressure dependent electric switch comprising a housing defining a switch chamber, a chelate chamber, a chelate chamber gas inlet port, and a chelate chamber gas outlet port; a reversible oxygen-carrying chelate material disposed within said chelate chamber; a reciprocable contact plate bearing on said chelate material; a microswitch; and force transmitting means disposed between said plate and the armature of said microswitch.

9. An apparatus responsive to variations in the partial pressure of oxygen in a gaseous system comprising a container having a gas inlet port and gas outlet port and a closure movable inwardly and outwardly thereof to thereby vary the volume of said container, a quantity of a reversible, oxygen-carrying chelate substantially filling said container and in pressure-transmitting relation to said closure, and means coupled to said closure and responsive to movement thereof.

10. In a device responsive to variations in the partial pressure of oxygen in a system of mixed gases, the combination comprising a housing defining a chelate chamber having an inlet port and an outlet port; a reversible oxygen-carrying chelate material disposed within said chelate chamber and serving as a pressure source; said housing also including a movable wall member in contact with and reciprocably responsive to the pressure exerted by said chelate material, and means coupled to said wall member and responsive to movement thereof.

11. A chemico-mechanical transducer responsive to variations in the partial pressure of oxygen in a system of mixed gases, comprising means defining an enclosure, at least one wall of which is reciprocably mobile inwardly and outwardly, having a gas inlet port and a gas outlet port, a quantity of a reversible oxygen-carrying chelate disposed within, substantially filling, and in pressure-transmitting relationship with the reciprocably movable wall of said enclosure-defining means, and means coupled to said wall and responsive to movement thereof.

References Cited in the file of this patent

UNITED STATES PATENTS

| | | |
|---|---|---|
| 692,007 | Freymann et al. | Jan. 28, 1902 |
| 1,452,155 | Hanson | Apr. 17, 1923 |
| 1,523,322 | Walton | Jan. 13, 1925 |
| 2,057,236 | Hodge | Oct. 31, 1936 |
| 2,429,474 | McMahon | Oct. 21, 1947 |
| 2,508,490 | Calvin et al. | May 23, 1950 |

OTHER REFERENCES

Martell and Calvin: "Chemistry of the Metal Chelate Compounds," Prentice-Hall, Inc., New York, 1952, pages 337–350.